No. 887,433. PATENTED MAY 12, 1908.
R. E. SCHARZ.
NUT LOCK.
APPLICATION FILED DEC. 26, 1907.

WITNESSES:

INVENTOR:
Richard E. Scharz;
BY Geo. H. Strong.
ATTORNEY

UNITED STATES PATENT OFFICE.

RICHARD E. SCHARZ, OF OAKLAND, CALIFORNIA.

NUT-LOCK.

No. 887,433.

Specification of Letters Patent.

Patented May 12, 1908.

Application filed December 26, 1907. Serial No. 408,026.

*To all whom it may concern:*

Be it known that I, RICHARD E. SCHARZ, citizen of United States, residing at Oakland, in the county of Alameda and State of California, have invented new and useful Improvements in Nut-Locks, of which the following is a specification.

My invention relates to a device for preventing the loosening or turning of nuts on bolts.

The object of the present invention is to provide a simple, efficient nut-lock, for use in connection with machinery, apparatus, tools, appliances and all other manufactured articles requiring bolts and nuts, as well as in railroad construction and bridge building, and wherever it is desirable or essential to secure nuts to their bolts in such fashion as to prevent the nuts loosening or coming off.

The invention consists of the parts and the construction and combination of parts as hereinafter more fully described and claimed, having reference to the accompanying drawings, in which—

Figures 1, 2:
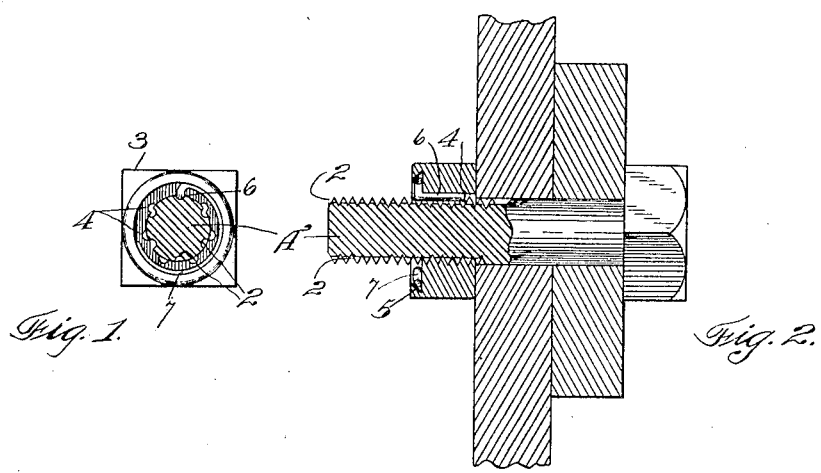
Figure 3:
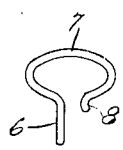

Figure 1 is an end view. Fig. 2 is a central vertical sectional view. Fig. 3 is a perspective view of the locking ring.

A represents a threaded bolt provided with any suitable number of lengthwise extending grooves 2. 3 is a nut fitting this bolt, and having also a series of grooves 4 at right angles to, and intersecting its threads. Preferably, for purposes hereafter to be stated, the number of grooves in the nut will not be precisely the same as the number in the bolt, but preferably one more or one less. The outer side of the nut around its threaded perforation is chambered and under-reamed to provide an undercut groove 5 circumscribing the bolt hole, and designed for the purpose of housing and securing the nut-locking device in position.

The nut-locking device is preferably made of spring wire and comprises a shank portion 6 to fit registering grooves 2—4 in the bolt and nut, and a ring or segmental portion 7 arranged at right angles to the stem 6.

In practice, the device is operated by screwing the nut on to the bolt tight enough to serve its purpose of holding parts of the machinery, etc., in place, and to bring one of the grooves in the nut opposite one of the grooves in the bolt, to form a circular passage, into which is next inserted the shank member 6. The circular spring 7 adjoining the stem, is then forced under or into the under-cut flange or groove 5 in the end of the nut, the free end of the circular portion 7 being bent slightly downward, as shown at 8, to form a projecting portion which engages the bottom of the groove, and is designed to press the portion 7 snug in under the overhanging ledge of the groove in the nut. The number of grooves in the bolt and on the nut may vary, but preferably the number in one would be odd, as compared with an even number on the other part, so that there will be relatively different distances between the grooves in the bolt and nut; and in consequence, the nut never need be turned but a small fraction of a revolution to bring two opposed grooves 2—4 into register to allow for the insertion of the locking device. This permits a very fine adjustment of the nut-lock, which is not usually possible in devices of this character.

The ring portion 7 of the locking device is made springy, and always has sufficient inherent elasticity to cause it to expand into the under-reaming of the nut.

Having thus described my invention, what I claim and desire to secure by Letters Patent is—

1. A nut-lock consisting of a bolt having a plurality of longitudinal grooves, a nut fitting the bolt, said nut being provided with an under-cut groove in its outer end and having a plurality of longitudinal grooves extending from the first-named groove inwardly through the nut and intersecting the threads thereof, and a spring having an annular portion sprung into engagement with and housed within the under-cut groove and having a straight portion engaging matching grooves in the nut and bolt whereby the nut is prevented from turning relative to the bolt.

2. A nut-lock consisting of a bolt having a plurality of longitudinally extending grooves, a nut adapted to fit said bolt said nut having an under-cut groove in its outer face and having a series of parallel grooves leading from the under-cut groove and intersecting the threads of the nut, and a member having an expansible ring-portion adapted to be sprung into engagement with the under-cut groove in the nut and having a right-angled portion to fit matching portions of grooves in the nut and bolt.

3. A nut-lock consisting of a bolt having a plurality of longitudinally extending grooves, a nut adapted to fit said bolt said nut having an under-cut groove in its outer face and having a series of parallel grooves leading from the under-cut groove and intersecting the threads of the nut, and a member having an expansible ring-portion adapted to be sprung into engagement with the under-cut groove in the nut and having a right angled portion to fit matching portions of grooves in the nut and bolt, said ring portion having a projection adapted to engage the bottom of the under-cut groove to press the ring portion snugly into said groove.

In testimony whereof I have hereunto set my hand in presence of two subscribing witnesses.

RICHARD E. SCHARZ.

Witnesses:
LILLA SCHARZ,
ROBERT C. YOUNG.